V. M. HORACEK.
TRACTOR FOR HEADERS.
APPLICATION FILED DEC. 22, 1911.
1,198,445.
Patented Sept. 19, 1916.
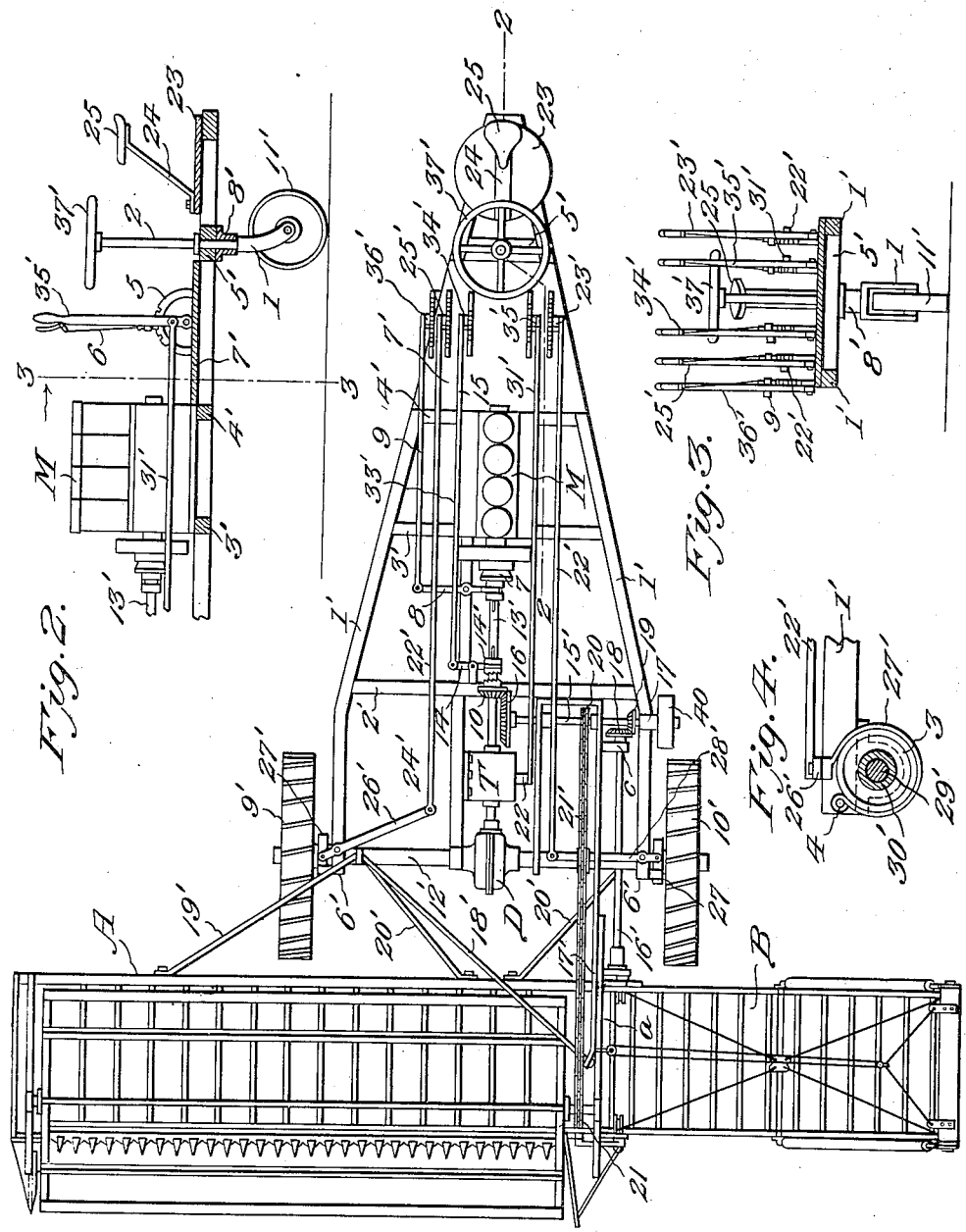

UNITED STATES PATENT OFFICE.

VACLAV M. HORACEK, OF TABOR, SOUTH DAKOTA.

TRACTOR FOR HEADERS.

1,198,445.     Specification of Letters Patent.     Patented Sept. 19, 1916.

Application filed December 22, 1911. Serial No. 667,355.

*To all whom it may concern:*

Be it known that I, VACLAV M. HORACEK, a citizen of the United States, and a resident of Tabor, in the county of Bonhomme and State of South Dakota, have invented certain new and useful Improvements in Tractors for Headers, of which the following is a specification, reference being had to the accompanying drawings.

This invention has relation to certain new and useful improvements in farm tractors employed in connection with agricultural machinery, and the primary object of my invention is to provide a three wheeled tractor of this general character of a simple and inexpensive nature and of a compact and durable construction, which shall be capable of convenient attachment to a harvesting machine such as a header, header binder, or corn harvester, said harvester being secured to the tractor in an equally balanced manner, the construction permitting the harvester being turned at right angles.

Another object is to provide a three wheeled farm tractor, arranged so that the same can be employed to push or pull a farm implement or vehicle.

A further object is to provide a farm tractor having a driving pulley so that machinery detached from the tractor, such as an elevator, corn sheller or the like, may be operated, and a still further object is to provide an auto-harvester, so arranged that the harvesting mechanism will be actuated by the engine of the tractor.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1 shows a top view disclosing my tractor as secured to a header. Fig. 2 shows a fragmentary elevational view disclosing the position of the steering wheel with parts broken away. Fig. 3 is a section on line 3—3 of Fig. 2. Fig. 4 shows a notched detached detail of one of the brake bands as used in my invention.

The object of my present invention is to provide a three wheeled farm tractor, especially constructed with the idea of securing the same to a harvesting machine of conventional construction, such as a header, header binder or corn harvester.

My invention includes a transmission gear of conventional construction embracing two forward speeds and one reverse. The tractor is further so constructed that the harvesting machine may be secured to the tractor in an equally balanced condition allowing the adjusting effects of the harvesting machine being readily operated. As the harvesting mechanism is actuated by the engine of the tractor the liability of the machine choking is entirely eliminated.

An important feature in connection with my present invention lies in the fact that the tractor wheels are not employed to actuate the harvester mechanism, so that the slipping of the tractor wheels in no way interferes with the operation of the harvester. From this it will be understood that the engine of the tractor not only propels the tractor but operates the harvesting mechanism as well. There is a special advantage in this arrangement in that in hauling the binder through heavy grain the speed of the tractor may be diminished. This will insure the grain being properly harvested with no danger of the machinery becoming choked.

In the accompanying drawings the letter A designates a harvester and B an elevator thereto of conventional construction. This harvester and elevator are shown as operatively connected to a three wheeled tractor embodying my invention.

In Fig. 1 the numerals 1', 1' represent the divergently held side members of a suitable carriage frame which are connected and strengthened by means of the cross braces 2', 3', 4', and 5'. These frame members 1' end in the axle bearings 6'. As clearly shown in Fig. 1, the carriage frame is triangular in outline and is provided at what forms its rear, with a steering caster wheel 11'. This wheel is held within the fork 1, forming part of the steering shaft 2 which at its upper end is provided with the steering wheel 37'. This shaft 2 is revolubly held within the bearing 8' forming a part of the cross brace 5', as shown in Fig. 2. This caster wheel 11' supports one end of the carriage frame.

Held within the axle bearings 6' is the axle boxing 12' giving support to a driving axle 29' shown in Fig. 4 and having secured to its ends the traction wheels 9' and 10'. This axle 29' is connected to a suitable differential of any approved type. In the drawing I have merely shown the outer casing of the differential from which is shown as extending the main driving shaft 13'.

Secured to the hub 30' of each traction wheel is a brake disk 3, while secured to a suitable part of the carriage frame 1' is a pin carrying the brake band 27' the upper end of which is secured to a brake-arm 26' operated by means of a brake rod 22'. As shown each traction wheel is provided with such a brake mechanism, the brake upon the wheel 10' being operated by means of the brake arm 28'. Extending from the brake arm 28' is a brake rod 22'.

Each of the brake rods 22' is secured to a brake lever, the rod extending from the arm 28' being secured to the brake lever 23' while the brake rod extending from the arm 26' is secured to a brake lever 25'. Both of these brake levers are arranged to operate in connection with a notched sector 5 as shown in Fig. 2, each being provided with a spring actuated locking mechanism of usual construction.

Centrally held upon the carriage frame is a motor M, from which extends the main driving shaft 13' passing through a transmission T, of any suitable type into the differential D. This main driving shaft 13' is provided with a suitable friction clutch 7 shown in Fig. 1 operated by means of a lever 8 from which lever extends an operating rod 9 secured to a lever 36'. The sliding member of this friction clutch is splined to the shaft 13' and by means of this friction clutch 7, the driving and operating mechanism of the tractor may be brought into connection with the motor.

Loosely held upon the main driving shaft 13' is a clutch pinion 10 and splined to the shaft 13' proximal to said pinion 10, is the clutch collar 14' operated by means of the lever 14, this lever being actuated by means of the rod 33' secured to the lever 34'. This lever 34' is also provided with a locking means to connect the same to a suitably notched sector in the manner disclosed in connection with the lever 23' in Fig. 2.

Secured to the carriage and especially to the cross brace 2' is the angular main brace 17' which extends rearward beyond the tractor and is connected to a member a, of the harvester. This main brace 17' forms a part of the harvester and is arranged to be detachably secured to the tractor frame.

The pinion 10 is arranged to mesh with the bevel gear 16 carried upon the driven shaft 15', this shaft being held within suitable bearings of the main brace 17' as shown in Fig. 1. At its outer end this shaft 16 is held within a bearing 17 through which it extends and gives support to a suitable belt pulley 40. This belt pulley 40 is arranged to be brought into play when it is intended to use the motor for the purpose of driving some auxiliary machinery detached from the motor, such as an elevator, corn sheller and the like. The main brace 17' is provided with a bearing c within which is revolubly held the harvester driving shaft 16' having a pinion 18 meshing with the pinion 19 secured to the driven shaft 15'. In operating the clutch collar 14' the harvester driving gear 16' may be actuated through the intermedium of the driven shaft 15' and its gear connections. This shaft 15' further carries a chain gear 20 over which a driving chain 21' passes, this chain also passing over the chain gear 21 secured to the reel of the harvester.

As shown in Fig. 1 the transmission gear T, is provided with a crank 22 and extending from this crank 22 is the connecting rod 31' which is led to a lever 35' employed to control the transmission. This transmission lever is also provided with a suitable locking means.

Secured to the upper portion of the two divergently held frame braces 1', and at their union, is the platform 23, to which is secured the standard 24 carrying an ordinary seat 25'.

The operation of my device is very simple. In going to or coming from the field, the operator can stand on the platform 7' between the motor M and the steering wheel 37' so that the caster wheel 11' will be in front. In the working operation of the harvester, however, the traction wheels 9' and 10' form the front of the tractor.

The levers employed to control the harvester and elevator have not been shown as these form no part of my invention. They are preferably, however, placed proximal to the operator's seat 25, as are the levers that have been described.

The motor having been set in motion the operator can throw the traction wheels into gear, in manipulating the friction clutch 7. The tractor is then steered and guided by means of the caster wheel 11'. When it is desired to turn a corner at right angles one of the brake arms 26' or 28' is brought into service to check its connected wheel, while the opposite wheel is reversed. In this way the harvester can be squarely turned at any point at right angles to its previous path. The harvester operating mechanism is thrown into operation through the intermedium of the clutch lever 34' which brings the transverse driven shaft into play to drive the harvester shaft 16'. This construction then permits the harvesting mechanism being operated independent of the movement of the tractor as the traction wheels 9' and 10' simply serve to advance the tractor and are not employed to drive any of the machinery. Under these conditions even in the heaviest grain there will be no choking of the harvester mechanism for the reason that where the stand of grain is particularly heavy, the tractor is very slowly advanced while the harvesting mechanism is working at its maximum speed. This construction also eliminates any stalling of the harvesting mechanism as is the case where the mechanisms are driven by the bull wheels, as when the harvester is pushed by draft animals.

As the harvesters are used but a very short time during each year, the instrumentalities are so arranged that the implement may be detached in disconnecting the main brace 17' and the braces 18', 19' and 20' as well as disconnecting the chain 21' and shaft 16'. The tractor can then be used in connection with any implement or wagon that can be pushed or pulled. The standard 24 can be reversed and placed between the operating levers, so that the tractor can be driven with the caster wheel in front.

A harvester tractor constructed according to my invention is comparatively inexpensive, and is both durable and efficient in operation, and the tractor may be readily detached or secured to the harvester.

Having thus described my said invention, what I claim as new and desire to secure by United States Letters Patent is:

The combination in a three-wheeled farm tractor, of a bearing, two divergently held side frame bars, having their rear ends secured to said bearing the forward ends of said frame bars each having an axle bearing, a steering shaft held within said bearing, said steering shaft ending in a fork at its lower end, a caster wheel supported within said fork, a steering wheel secured to the upper end of said steering shaft, an axle secured within said axle bearings, a traction wheel secured to each end of said axle, a differential connected to said axle, a brake disk secured to the hub of each traction wheel, a brake band having one end secured to each frame bar, a brake arm horizontally secured to each frame bar, the other end of each brake band being secured to a brake arm, and an operating lever connected to each brake arm whereby said brakes may be applied to said wheels, said caster wheel being operated in negotiating a curve.

In testimony whereof I affix my signature, in presence of two witnesses.

VACLAV M. HORACEK.

Witnesses:
 GEORGE W. SUES,
 ANNIE HIND.